July 15, 1941.                E. G. CHAMBERS                2,249,418
                              CONTROL APPARATUS
                           Original Filed Feb. 21, 1938

INVENTOR.
Edward G. Chambers
BY  F. D. Hicks
HIS ATTORNEY

Patented July 15, 1941

2,249,418

UNITED STATES PATENT OFFICE 2,249,418

CONTROL APPARATUS

Edward G. Chambers, Toledo, Ohio, assignor to The Indemse Corporation, a corporation of Michigan Original application February 21, 1938, Serial No. 191,720. Divided and this application October 3, 1938, Serial No. 232,937

6 Claims. (Cl. 200—81)

My invention pertains to an improved apparatus and instrument for controlling the operation of automatic stoker fired furnaces, and more particularly for controlling stokers to furnaces of the type used for heating residences and other buildings. This patent application is a division of my copending patent application Serial No. 191,720 filed February 21, 1938, and issued as Patent No. 2,147,881 February 21, 1939.

I am aware that in some previously known stoker instruments, apparatus and systems, have been provided which purport to apportion the air supply to the rate of fuel consumption, or to regulate the speed of fuel feed as some function of the outside temperature, or to maintain a constant pressure of air supplied in the windbox, however, such previously known apparatus requires frequent attention and manual adjustment as the heat load conditions vary, fails to provide efficient combustion conditions under varying load conditions, and is complicated to adjust and maintain. For such reasons stoker control apparatus previously available has been especially unsatisfactory for controlling stoker-fired furnaces for heating homes and other buildings, where skilled attention is not available at all times.

It is accordingly an object of my invention to provide a sensitive coordinating stoker control instrument of simple construction for accurately combining control forces which are produced corresponding to factors in the operation of a stoker to provide a coordinated control effect for controlling the operation of a stoker.

It is also an object of my invention to provide improved means for controlling the operation of automatic stoker-fired furnaces wherein the wind-box pressure is automatically varied inversely as the outside temperature varies, while the fuel feeding rate is varied with the wind-box pressure, thus providing the proper depth of fuel bed for optimum combustion conditions under all the different load conditions that must be satisfied by the furnace and which also operates to eliminate blow-holes and also to prevent feeding the furnace full of fuel after a fire is extinguished.

Further objects and advantages are within the scope of my invention such as relate to the arrangement, operation and function of the related elements, to various details of construction and to combinations of parts, elements per se, and to economies of manufacture and numerous other features as will be apparent from a consideration of the specification in conjunction with the drawing disclosing a form of my invention, which may be preferred, in which.

Figure 1:
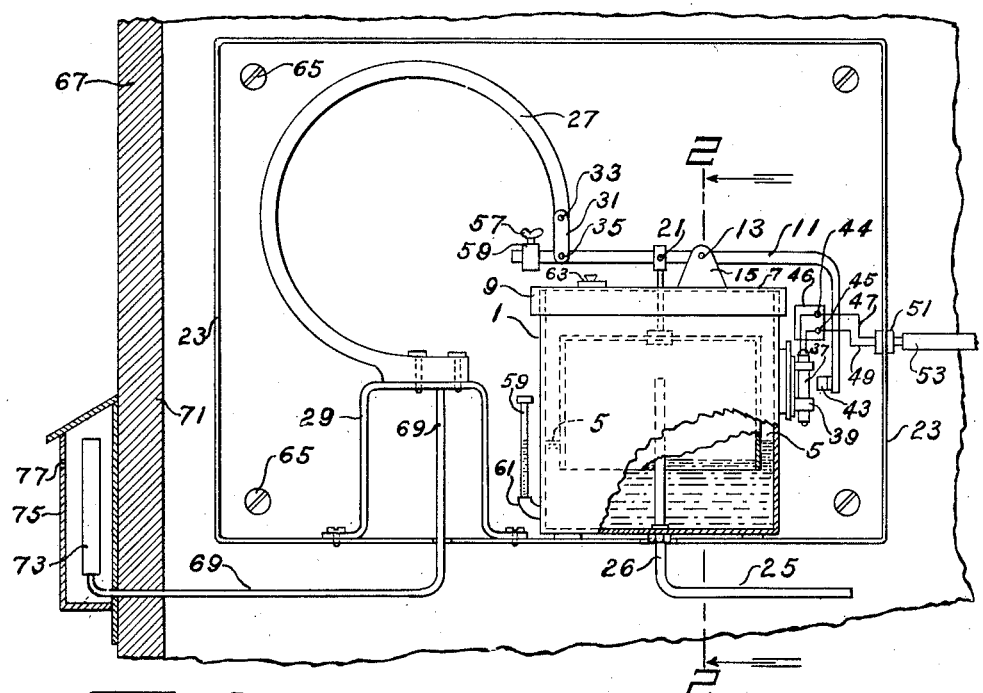
Fig. 1 is a side elevational view showing my sensitive coordinating stoker control instrument.
Figure 2:
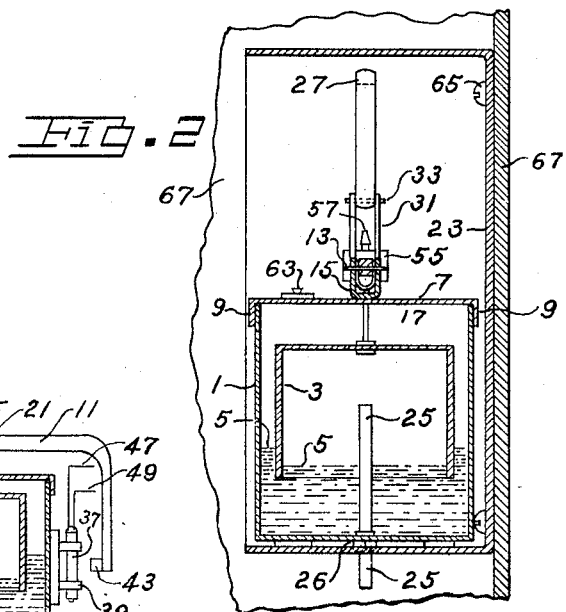
Fig. 2 is a sectional view taken on line 2—2 of Fig. 1.

Referring more particularly to Figs. 1 and 2 of the drawing, my sensitive coordinating stoker control instrument comprises an open top vessel 1 which may be made of any suitable material, but for this purpose I preferably provide a vessel of sheet metal which is suitably punched out in a manner well known in the art of sheet metal working. The vessel 1 receives a hollow bell-element 3 of inverted cup shape which is disposed with its open edges downward in the vessel for immersion in a quantity of liquid 5 which floats the bell-element and provides a seal around its lower edges. The vessel 1 and the enclosed bell-element 3 may be of any suitable cross section either circular or rectangular, and the dimensions are suitably chosen so that the bell-element moves freely on the liquid without causing frictional engagement on the side walls of the vessel to interfere with the accuracy and sensitivity of the instrument. A cover 7 is removably disposed on the open top of the vessel, and it is secured in position by a marginal flange 9 turned downwardly from the periphery of the cover around the upper open edges of the vessel.

For coordinating the various control forces which are generated as a function of certain factors related to the operation of a stoker, I provide a movable regulating member comprising a lever arm 11. The regulating lever arm 11 is pivotally journalled on a pivot 13 which is mounted on an upstanding bracket 15 on top of the cover. For transmitting control forces from the bell-element 3, a metal link 17 is secured thereto in any suitable manner, and extending loosely through an aperture 19 in the cover 7, it is pivotally connected at its upper end to the regulating lever arm 11 by means of a pivot pin 21 extending therethrough.

The instrument is mounted in an instrument box 23, which is preferably a strong sheet metal box, similar to boxes usually provided for housing electrical switches, and the vessel 1 is secured to the bottom thereof in any suitable manner. A small air control conduit 25 passes through the center of the bottom of the vessel, into which it may be secured and hermetically sealed by a suitable bushing 26, and it extends upwardly therein opening at its upper end into the cavity of the bell-element 3. From the instrument box 23, the conduit 25 extends for connection into the windbox or air conduit of a stoker to be controlled, as shown and described in my copending Patent No. 2,147,881 issued February 21, 1939.

Adjacent the vessel 1, I mount a Bourdon tube 27 with one end thereof rigidly supported on a bracket 29 which rises up from the bottom of the instrument box. The bracket 29 is secured to the bottom of the instrument box in any suitable manner, and in a proper position to project the movable end of the Bourdon tube 27 over the regulator lever arm. A link 31 provides a flexible connection from a pivot pin 33 in the movable end of the Bourdon tube to a pivot pin 35 extending through the regulator arm 11 for accurately influencing the operation of the regulator arm in accordance with varying fluid pressures applied in said tube corresponding to a variable condition effecting the operation of the stoker system, which will be subsequently described.

By this construction the regulator arm 11 is arranged for receiving and coordinating two different forces generated in accordance with the fluid pressures applied separately into the bell-element 3 and the Bourdon tube 27, in accordance with two different variable conditions.

For actuation by the regulator arm 11, any suitable control means of a delicate nature may be associated therewith, such as any delicate electrical circuit making and breaking means usually used with delicate instruments. For this purpose I preferably utilize a sealed mercury contact magnetic switch, of the type sold on the market as Mercoid #9–81 for example, and the glass tube 37 of the switch is mounted externally in spring clips 39 projecting from a bracket 41 on one side of the vessel 1. Such a magnetic switch is actuated by merely moving a magnet 43 adjacent thereto, in a well known manner. To support the actuating magnet 43, one end of the regulator arm 11 of my instrument is turned down adjacent the switch tube 37 and the actuating magnet 43 is secured thereon in any suitable manner. When the sum of the coordinated control forces exceeds a predetermined value on the arm, the magnet 43 moves nearer the switch tube 37, the switch is actuated and completes a connection between two wires connecting with two terminals 44 and 45 on a board in the instrument box. From the terminals two insulated wires 47 and 49 extend from the instrument box through a bushing 51 into a conduit 53 for connection into the stoker system to accomplish a desired operation.

To adjust the instrument to suit the operating characteristics of any particular installation or fuel, I provide means for applying a variable biasing force on the regulator arm, such as a weight 55 slidable thereon and secured with a thumb screw 57 in any adjusted position.

Any suitable liquid may be used in the vessel, but I prefer to provide a light oil for this purpose. To provide a convenient indication whereby the attendant may readily ascertain the level of the liquid, I provide a glass tube or gauge 59 which is vertically supported on an elbow 61 which connects through the side wall of the vessel 1 below the liquid level to be maintained. For convenience in charging the liquid therein, a vent 63 is provided in the cover 7. The instrument box 23 may be mounted in any suitable location adjacent the stoker, as by screws 65 passing through the back wall of the box into a wall 67 of the building.

From the stationary end of the Bourdon tube in my sensitive stoker control coordinating instrument, a small conduit 69 extends downwardly through the bottom of the instrument box and through an outside wall 71 of the building for connection with a thermo-bulb 73. The thermo-bulb is mounted in an outside housing 75 having vents 77 to permit the air to circulate freely therethrough, and it contains an expansible fluid suitably selected to provide a varying range of pressure corresponding to the range of temperatures of the outside atmosphere, as will be understood.

Figure 3:
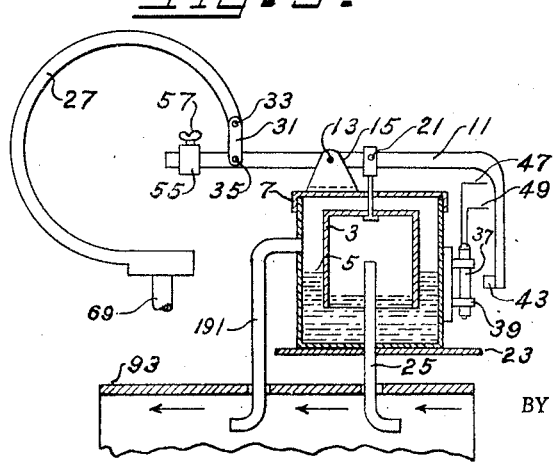
Fig. 3 is a diagrammatic view showing a different embodiment of control apparatus responsive to the velocity of air flowing in the stoker supply conduit.

In Fig. 3 I have disclosed another embodiment of my stoker control arranged for operation in response to the velocity of the air in the air supply conduit 93, rather than in response to the static pressure thereof as in the first embodiment. When the fuel bed gets thinner, the velocity of the air in the air supply conduit 93 increases. In this embodiment, the air control conduit 25, from the instrument, extends into the air supply conduit 93 with a tip bent to extend axially therein toward the air stream to convert the velocity of the air for operating the instrument.

A second air control conduit 191 extends into the air supply conduit 93 and is provided with a bent tip portion which extends axially therein in the down stream direction to provide pressures which are less than static whereby a maximum pressure differential is obtained for operating the control instrument. The second control conduit is connected into the vessel 1 of the control instrument above the level of the sealing liquid therein. This arrangement tends to raise the bell-element 3 when the air supply velocity increases, and to lower it as the velocity decreases which is just the opposite operation from the first embodiment of my control system. For this reason the bracket 15 and the pivot 13 which supports the lever arm 11 of the coordinating instrument are positioned on the opposite side of the cover providing an arrangement wherein the link 17 connects from the bell-element 3 to the lever arm 11 at a point on the opposite side from the connection of the Bourdon tube therewith.

Although air leakage occurs through the loose fitting aperture 19 in the cover around the link 17, it is relatively slight as compared with the air capacity of the air supply conduit which is of a relatively larger cross section.

A control magnet 43 is mounted on the down turned end of the lever arm 11 for controlling a magnetic mercury contact tube 37, as in the first embodiment, and from the Bourdon tube 27 the conduit 69 extends for connection with a thermo-bulb exposed to the outside temperature.

The variable distortion of the Bourdon tube applies variable effects, corresponding to outside temperatures, to the pivoted lever arm 11 which coordinates with the effects imposed thereon by the bell-element 3 as a function of the fuel bed depth. The resultant of the effects thus coordinated is applied for operating the switch 37 to make or break the circuit between the conductors 47 and 49 which extend for controlling the stoker-fired furnace 81, as previously set forth. By reversing the connections of the control conduits into the supply conduit 93, the instrument may also be used with the same pivot mounting as in Figs. 1 and 2, as will be understood. It will be understood that in either modification the clutch for driving the fuel feeder may be replaced by a magnetic pawl or a second electric motor, if desired.

By properly selecting the characteristics of the Bourdon tube and adjusting the slidable biasing weight, suitable response characteristics are obtained for different stokers, systems and fuels.

It is apparent that within the scope of my invention, modifications and different arrangements may be made other than therein disclosed, and the present disclosure is illustrative merely, the invention comprehending all variations thereof.

I claim:

1. A coordinating instrument comprising, a vessel for receiving and holding a quantity of liquid, a hollow element of bell like conformation disposed in said vessel with its open side directed downwardly, an air pressure conduit connecting from the cavity in the hollow element, a regulating member, stationary support means for rigidly mounting said vessel, means mounting said regulating member movably adjacent said vessel, pivotal means operatively connecting said bell-like element to said regulating member, a Bourdon tube, means for rigidly mounting and stationarily supporting one end of said Bourdon tube adjacent said vessel, flexible means operatively connecting the movable end of said Bourdon tube to said movable regulating member which is operated by the coordinated influence of forces from the bell-like element and the Bourdon tube, and control means associated with said regulating member for operation thereby.

2. A coordinating control instrument comprising, a vessel for holding a quantity of sealing liquid, a bell-element disposed in said vessel with its open side down, a cover on said vessel, a regulating lever arm, a pivot bearing on said cover for pivotally mounting said lever arm thereon, means extending operatively through said cover from said bell-element to said lever arm, control means associated with said lever arm for operation thereby, a Bourdon tube, means rigidly supporting one end of said Bourdon tube in a predetermined stationary position adjacent said vessel, and means operatively connecting the movable end of said Bourdon tube with said lever arm.

3. A coordinating control instrument as defined in claim 2 in which the control means associated with the regulating member comprises a magnetic mercury type switch mounted adjacent the regulating member, and a magnet carried by the regulating member adjacent the mercury type switch.

4. An enclosed coordinating control instrument comprising, a sheet metal box of substantially rectangular conformation open at one side, a vessel for holding a quantity of sealing liquid, said vessel being mounted on the bottom wall of said box adjacent the open side thereof, a bell element disposed in said vessel with its open side directly downwardly for floating in sealed relation on the liquid provided in the vessel, a varying fluid pressure conduit connecting from the cavity in said bell and passing downwardly through the bottom wall of said box, a cover on said vessel, a regulating lever arm, a pivot bearing on said cover for pivotally mounting said regulating lever arm thereon, flexible connection means extending through the cover on the vessel and connecting operatively between the bell element and the lever arm, a Bourdon tube, stationary means for mounting one end of the Bourdon tube rigidly on said box in a predetermined position relative to said vessel, conduit means connecting from the stationary end of said Bourdon tube, flexible connection means operatively connecting the movable end of the Bourdon tube to said regulating lever arm, and control means operatively associated with said lever arm for operation thereby.

5. In combination in a coordinating control instrument; a plurality of elements each responsive to a controlling condition or quantity, a control member operatively connected with said plurality of elements, means movably supporting said control member, a magnetic mercury type switch mounted adjacent said control member, and a magnet carried by the movable control member adjacent the mercury type switch.

6. A coordinating control instrument comprising; a vessel for holding a quantity of liquid; a float element disposed in said vessel for floating on the liquid; a regulating member; means for movably mounting said regulating member adjacent said vessel; a fluid pressure distortable member mounted adjacent said vessel; free connecting means operatively connecting between the movable regulating member, the float element, and the pressure distortable member for applying control forces to be coordinated by the regulating member; a magnetic mercury type switch; and a magnet carried by the regulating member adjacent the mercury type switch.

EDWARD G. CHAMBERS.